No. 733,423. PATENTED JULY 14, 1903.
M. VON RECKLINGHAUSEN.
ELECTRIC VAPOR APPLIANCE.
APPLICATION FILED MAY 6, 1903.
NO MODEL.
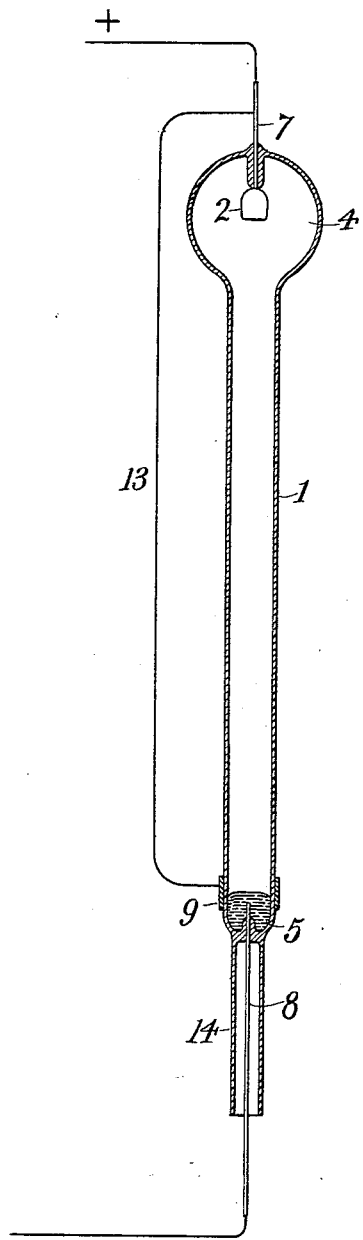
Witnesses:
Tho. D. H. Brown, Jr.
W. H. Capel.
Inventor
Max von Recklinghausen
by Charles A. Terry, Atty No. 733,423.  
Patented July 14, 1903.

UNITED STATES PATENT OFFICE.

MAX VON RECKLINGHAUSEN, OF NEW YORK, N. Y., ASSIGNOR TO COOPER HEWITT ELECTRIC COMPANY, A CORPORATION OF NEW YORK.

ELECTRIC VAPOR APPLIANCE.

SPECIFICATION forming part of Letters Patent No. 733,423, dated July 14, 1903.

Application filed May 6, 1903. Serial No. 155,941. (No model.)

*To all whom it may concern:*

Be it known that I, MAX VON RECKLINGHAUSEN, a subject of the Emperor of Germany, and a resident of New York, county of New York, State of New York, have invented certain new and useful Improvements in Electric Vapor Appliances, of which the following is a specification.

A recognized feature of the gas or vapor electric apparatus patented to Peter Cooper Hewitt on the 17th day of September, 1901, is a band or strip of metal near the negative electrode, which has usually been described as a "starting-band." This starting-band is generally connected with the positive side of the circuit, and its function appears to be that of developing an electric strain in the neighborhood of the negative electrode which assists in the ultimate breaking down of the negative-electrode resistance by the current applied to the terminals of the apparatus. The action is the same whether the apparatus be used as a lamp or for any other purpose. Various substitutes for the starting-band have been devised; but it is still a feature of many of the devices and serves a useful purpose. When the described arrangement is made use of, it usually happens that the starting-band, which is connected with the positive side of the circuit, is in rather close proximity to the lead-wire running to the negative electrode. Accordingly there is more or less danger of sparking taking place between the starting-band and the negative lead-wire, which danger becomes particularly imminent when the devices are run on alternating-current circuits requiring a starting potential at every alternation.

My invention, here shown as applied to a vapor-lamp having a negative electrode of mercury, is intended to obviate the danger mentioned.

The drawing shows a vertical section of a lamp of this class, 1 being a tubular container having an enlargement 4 at its upper end and having a positive electrode 2, of iron, and a negative electrode 5, of mercury. The materials of these electrodes may be varied, it being understood that the negative electrode shall be of some volatilizable conducting material, of which mercury is a good example. Lead-wires 7 and 8 are connected with the electrodes 2 and 5, respectively. Outside the tubular container I place a starting-band 9, which may be a metallic paint or a strip or band of foil, such as tin-foil, and this starting-band is connected by a wire 13 with the leading-in wire 7 or with the positive side of the circuit at some other point.

To avoid sparking between the starting-band 9 and the negative lead-wire 8, I provide a tubular extension 14, surrounding the said lead-wire, either with or without an intervening space. In other words, the extension 14 may, if preferred, be sealed directly to the lead-wire.

When the apparatus is to be employed on alternating-current circuits, both electrodes will be of mercury or other volatilizable fluid, and each starting-band will be connected to the circuit on the opposite side from the electrode near which it is located. As the electrodes under such circumstances are alternately positive and negative, the conditions are practically the same as those herein described.

I claim as my invention—

1. In a gas or vapor electric apparatus, a starting-band near the negative electrode, means for connecting the said starting-band with the positive side of the circuit, a lead-wire running to the negative electrode, and means for preventing sparking between the starting-band and the said lead-wire.

2. In a gas or vapor electric apparatus, a starting-band near the negative electrode, means for connecting the said starting-band with the positive side of the circuit, a lead-wire running to the negative electrode, and means for preventing sparking between the starting-band and the said lead-wire, such means consisting of a tubular extension of the apparatus surrounding the said lead-wire to a point beyond the sparking distance.

Signed at New York, in the county of New York and State of New York, this 28th day of April, A. D. 1903.

MAX VON RECKLINGHAUSEN.

Witnesses:
 WM. H. CAPEL,
 GEORGE H. STOCKBRIDGE.